(12) United States Patent
Taniguchi et al.

(10) Patent No.: US 10,909,155 B2
(45) Date of Patent: Feb. 2, 2021

(54) INFORMATION PROCESSING APPARATUS

(71) Applicant: FUJI XEROX CO., LTD., Tokyo (JP)

(72) Inventors: Motoki Taniguchi, Kanagawa (JP);
Tomoko Okuma, Kanagawa (JP);
Tomoki Taniguchi, Kanagawa (JP);
Shotaro Misawa, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 285 days.

(21) Appl. No.: 15/963,986

(22) Filed: Apr. 26, 2018

(65) Prior Publication Data

US 2019/0095527 A1 Mar. 28, 2019

(30) Foreign Application Priority Data

Sep. 26, 2017 (JP) ................... 2017-184582

(51) Int. Cl.
*G06F 16/335* (2019.01)
*G06N 20/00* (2019.01)
*G06F 16/38* (2019.01)
*G06Q 10/10* (2012.01)

(52) U.S. Cl.
CPC ............ *G06F 16/335* (2019.01); *G06F 16/38* (2019.01); *G06N 20/00* (2019.01); *G06Q 10/107* (2013.01)

(58) Field of Classification Search
CPC ....... G06F 16/38; G06F 16/335; G06N 20/00; G06Q 10/17
USPC ....................................... 707/736
See application file for complete search history.

(56) References Cited

U.S. PATENT DOCUMENTS

| 2006/0053279 | A1* | 3/2006 | Coueignoux | H04L 51/12 713/154 |
| 2008/0052101 | A1* | 2/2008 | Ziade | G06Q 40/08 705/4 |
| 2010/0241476 | A1* | 9/2010 | Fitzpatrick | G06Q 10/10 705/7.18 |
| 2010/0257507 | A1* | 10/2010 | Warren | G06F 8/40 717/106 |
| 2012/0036144 | A1 | 2/2012 | Okamoto et al. | |
| 2014/0358825 | A1* | 12/2014 | Phillipps | G06N 20/00 706/11 |
| 2014/0358828 | A1* | 12/2014 | Phillipps | G06N 20/00 706/12 |
| 2018/0329957 | A1* | 11/2018 | Frazzingaro | G06F 21/6254 |
| 2018/0336904 | A1* | 11/2018 | Piercy | G06F 16/9537 |
| 2020/0067861 | A1* | 2/2020 | Leddy | H04L 51/12 |

FOREIGN PATENT DOCUMENTS

| JP | 2004288111 | 10/2004 |
| JP | 2010204735 | 9/2010 |
| JP | 2013050853 | 3/2013 |

* cited by examiner

*Primary Examiner* — Dung K Chau
(74) *Attorney, Agent, or Firm* — Volpe Koenig

(57) ABSTRACT

An information processing apparatus includes a first label determination unit that determines a first label from information included in an e-mail, a second label determination unit that determines a second label from a result of a response made to the e-mail by a user, and a third label determination unit that determines a third label as a negative example for machine learning which is imparted to the e-mail, in a case where the first label and the second label do not correspond to each other.

5 Claims, 11 Drawing Sheets

FIG. 4

| MAIL ID | TITLE | TRANSMITTER | RECIPIENT | ATTACHED FILE |
|---|---|---|---|---|
| MAIL 1 | [IMPORTANT] CHANGE OF SPECIFICATION OF ○○ | USER A | USERS B, C, AND D | SPECIFICATIONS.pdf |
| MAIL 2 | [IMPORTANT] SEMINAR INFORMATION | USER A | USERS B, C, AND D | SEMINAR DATA.pptx |
| MAIL 3 | 3/21 WEEKLY REPORT | USER A | USERS D, E, AND F | NONE |

FIG. 5

| RULE ID | LABEL | RULE |
|---|---|---|
| RULE 1 | IMPORTANT | TITLE INCLUDES "[IMPORTANT]" AND "[URGENT]", AND ATTACHED FILE IS PRESENT |
| RULE 2 | ADJUSTMENT OF SCHEDULE | TITLE INCLUDES "[FIXED]" AND EXPRESSION OF DATE |
| RULE 3 | REPLY REQUIRED | TITLE INCLUDES "[REPLY REQUIRED]" OR "[REPLY DESIRED]" |

FIG. 6

| MAIL ID | OPERATOR | ACTION |
|---------|----------|------------|
| MAIL 1  | USER B   | REPLY      |
| MAIL 1  | USER C   | FORWARDING |
| MAIL 2  | USER D   | REPLY      |
| MAIL 3  | USER F   | REPLY      |

FIG. 7

| RULE ID | LABEL | RULE |
|---------|-------|------|
| RULE A1 | IMPORTANT | THE NUMBER OF RECIPIENTS HAVING PERFORMED REPLY AND FORWARDING IS EQUAL TO OR GREATER THAN HALF OF RECIPIENTS |
| RULE A2 | ADJUSTMENT OF SCHEDULE | RECIPIENT IS REGISTERED IN CALENDAR |

FIG. 8

| MAIL ID | LABEL BASED ON META INFORMATION | LABEL BASED ON HISTORY OF ACTIONS | FINAL LABEL |
|---|---|---|---|
| MAIL 1 | IMPORTANT | IMPORTANT | IMPORTANT |
| MAIL 2 | IMPORTANT | NO LABEL | IMPORTANT |
| MAIL 3 | NO LABEL | NO LABEL | NO LABEL |

FIG. 9

| MAIL ID | LABEL BASED ON META INFORMATION | LABEL BASED ON HISTORY OF ACTIONS | FINAL LABEL |
|---------|---------------------------------|-----------------------------------|-------------|
| MAIL 1  | IMPORTANT                       | IMPORTANT                         | IMPORTANT   |
| MAIL 2  | IMPORTANT                       | NO LABEL                          | NO LABEL    |
| MAIL 3  | NO LABEL                        | NO LABEL                          | NO LABEL    |

FIG. 10

| MAIL ID 1010 | LABEL BASED ON META INFORMATION 1020 | LABEL BASED ON HISTORY OF ACTIONS 1030 | FINAL LABEL 1040 | POSITIVE EXAMPLE /NEGATIVE EXAMPLE 1050 |
|---|---|---|---|---|
| MAIL 1 | IMPORTANT | IMPORTANT | IMPORTANT | POSITIVE EXAMPLE |
| MAIL 2 | IMPORTANT | NO LABEL | IMPORTANT | NEGATIVE EXAMPLE |
| MAIL 3 | NO LABEL | NO LABEL | NO LABEL | – |

FIG. 11

| MAIL ID | LABEL BASED ON META INFORMATION | LABEL BASED ON HISTORY OF ACTIONS | FINAL LABEL | POSITIVE EXAMPLE /NEGATIVE EXAMPLE |
|---|---|---|---|---|
| MAIL 1 | IMPORTANT | IMPORTANT | IMPORTANT | POSITIVE EXAMPLE |
| MAIL 2 | IMPORTANT | NO LABEL | NO LABEL | — |
| MAIL 3 | NO LABEL | NO LABEL | IMPORTANT | NEGATIVE EXAMPLE |

INFORMATION PROCESSING APPARATUS

CROSS-REFERENCE TO RELATED APPLICATIONS

This application is based on and claims priority under 35 USC 119 from Japanese Patent Application No. 2017-184582 filed Sep. 26, 2017.

BACKGROUND

Technical Field

The present invention relates to an information processing apparatus.

SUMMARY

According to an aspect of the invention, there is provided an information processing apparatus including a first label determination unit that determines a first label from information included in an e-mail, a second label determination unit that determines a second label from a result of a response made to the e-mail by a user, and a third label determination unit that determines a third label as a negative example for machine learning which is imparted to the e-mail, in a case where the first label and the second label do not correspond to each other.

BRIEF DESCRIPTION OF THE DRAWINGS

Exemplary embodiment(s) of the present invention will be described in detail based on the following figures, wherein:

FIG. 4 is a diagram illustrating an example of a data structure of a mail information table;

FIG. 5 is a diagram illustrating an example of a data structure of a rule table with meta information label;

FIG. 6 is a diagram illustrating an example of a data structure of an action history information table;

FIG. 7 is a diagram illustrating an example of a data structure of a rule table with action history label;

FIG. 8 is a diagram illustrating an example of a data structure of a learning data table;

FIG. 9 is a diagram illustrating an example of a data structure of a learning data table;

FIG. 10 is a diagram illustrating an example of a data structure of a learning data table;

FIG. 11 is a diagram illustrating an example of a data structure of a learning data table.

DETAILED DESCRIPTION

Hereinafter, an example of an exemplary embodiment in realizing the invention will be described with reference to the accompanying drawings.

Figure 1:
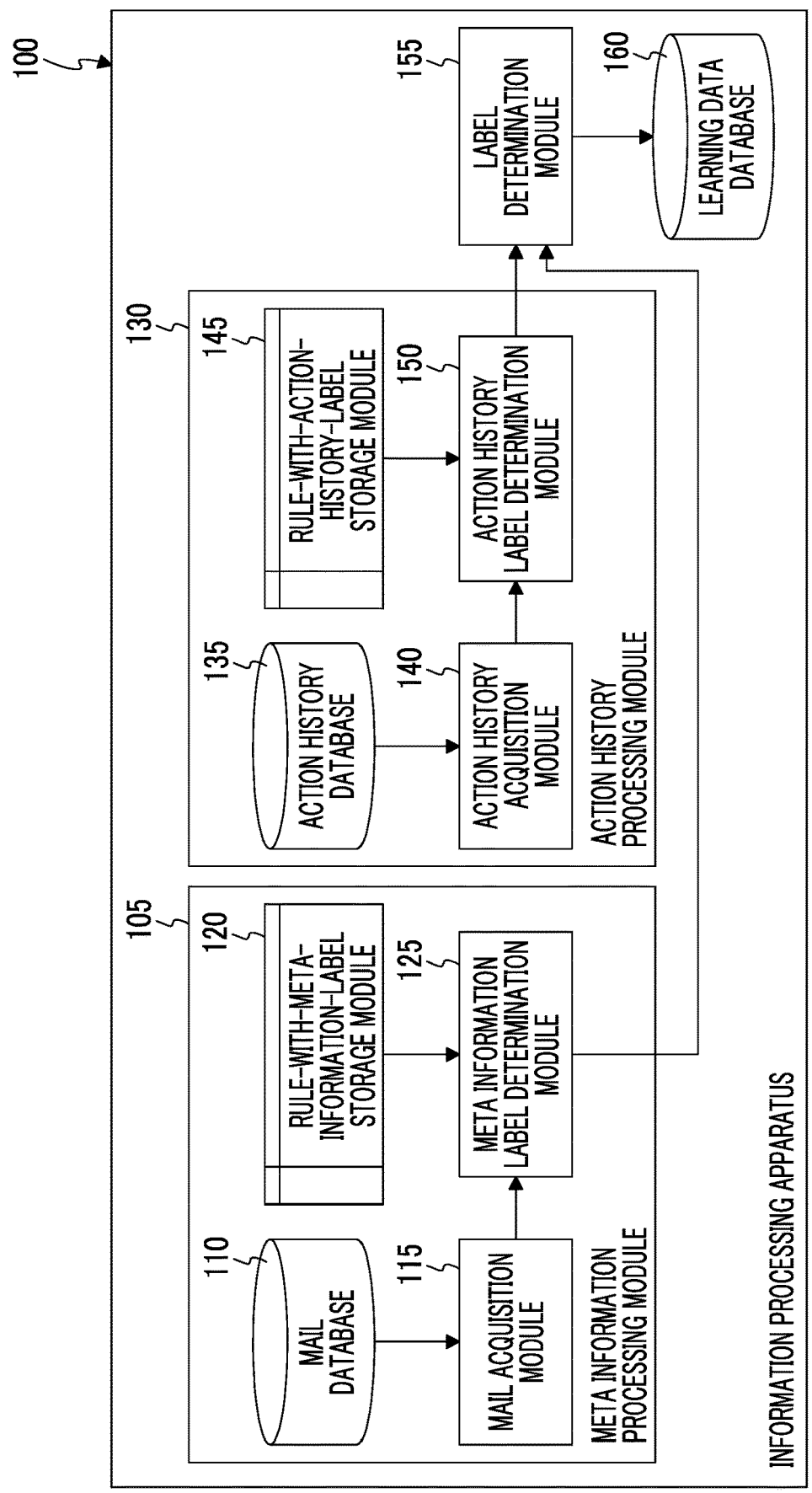
FIG. 1 is a conceptual module configuration diagram illustrating a configuration example according to this exemplary embodiment.

FIG. 1 is a conceptual module configuration diagram illustrating a configuration example of this exemplary embodiment.

Meanwhile, the term "module" refers to components such as software (computer programs) and hardware which are typically capable of being logically separated. Consequently, the term "module" in this exemplary embodiment not only refers to modules in a computer program, but also to modules in a hardware configuration. Thus, this exemplary embodiment also serves as a description of a computer program (a program that causes a computer to execute respective operations, a program that causes a computer to function as respective units, or a program that causes a computer to realize respective functions), a system, and a method for inducing functionality as such modules. Meanwhile, although terms like "store" and "record" and their equivalents may be used in the description for the sake of convenience, these terms mean that a storage apparatus is made to store information or that control is applied to cause a storage apparatus to store information in the case where the exemplary embodiment is a computer program. In addition, while modules may be made to correspond with function on a one-to-one basis, some implementations may be configured such that one program constitutes one module, such that one program constitutes multiple modules, or conversely, such that multiple programs constitute one module. Moreover, plural modules may be executed by one computer, but one module may also be executed by plural computers in a distributed or parallel computing environment. Meanwhile, a single module may also contain other modules. In addition, the term "connection" may be used hereinafter to denote logical connections (such as the transmission and reception of data, instructions, a referential relationship between pieces of data, and log-in) in addition to physical connections. The term "predetermined" refers to something being determined prior to the processing in question, and obviously denotes something that is determined before a process according to the exemplary embodiment starts, but may also denote something that is determined after a process according to the exemplary embodiment has started but before the processing in question, according to conditions or states at that time, or according to conditions or states up to that time. In the case of plural "predetermined values", the predetermined values may be respectively different values, or two or more values (this obviously also includes the case of all values) which are the same. Additionally, statements to the effect of "B is conducted in the case of A" are used to denote that a determination is made regarding whether or not A holds true, and B is conducted in the case where it is determined that A holds true. However, this excludes cases where the determination of whether or not A holds true may be omitted. Additionally, the case of the listing of things such as "A, B, C" is illustrative listing unless otherwise indicated, and includes a case where only one of them is selected (for example, only A).

In addition, the terms "system" and "apparatus" not only encompass configurations in which plural computers, hardware, or apparatus are connected by a communication medium such as a network (including connections that support 1-to-1 communication), but also encompass configurations realized by a single computer, hardware, or apparatus. The terms "apparatus" and "system" are used interchangeably. Obviously, the term "system" does not include merely artificially arranged social constructs (social systems).

Also, every time a process is conducted by each module or every time plural processes are conducted within a module, information to be processed is retrieved from a storage apparatus, and the processing results are written back to the storage apparatus after the processing. Consequently, description of the retrieval from a storage apparatus before processing and the writing back to a storage apparatus after processing may be omitted in some cases. Meanwhile, the storage apparatus herein may include hard disks, random access memory (RAM), an external storage medium, storage apparatus accessed via a communication link, and registers, and the like inside a central processing unit (CPU).

An information processing apparatus 100 which is this exemplary embodiment generates teacher data for machine learning using an e-mail, and includes a meta information processing module 105, an action history processing module 130, a label determination module 155, and a learning data database 160 as illustrated in the example of FIG. 1. For example, the information processing apparatus 100 generates teacher data with a case name with the subject of an e-mail and an action as a clue.

E-mail is a tool for two-way communication, and includes a transmitter's intention and a recipient's intention. Here, the transmitter's intention is reflected on contents of the e-mail, but the recipient's intention is often reflected on an action occurring by the received e-mail. In this case, a label having no recipient's intention reflected thereto may be attached in a case where a label is imparted using only the contents of the e-mail.

In addition, the transmitter's intention and the recipient's intention do not necessarily match each other. In a case where the transmitter's intention and the recipient's intention are different from each other, the accuracy of machine learning may be further increased in a case where the teacher data is treated as having a meaning of a negative example.

The meta information processing module 105 includes a mail database 110, a mail acquisition module 115, a rule-with-meta-information-label storage module 120, and a meta information label determination module 125. The meta information processing module 105 performs a label impartation process based on meta information. The meta information as mentioned herein is generated from information included in the e-mail, and may be, for example, a predetermined character string extracted from the subject (title) of the e-mail.

The mail database 110 is connected to the mail acquisition module 115. The mail database 110 stores the target mail.

The mail acquisition module 115 is connected to the mail database 110 and the meta information label determination module 125. The mail acquisition module 115 acquires information (for example, e-mail identification information (e-mail Identification (ID)), the title, the body, address information (TO), transmission source information (FROM), and the like) on the e-mail from the mail database 110, and transmits the acquired information to the meta information label determination module 125.

The rule-with-meta-information-label storage module 120 is connected to the meta information label determination module 125. The rule-with-meta-information-label storage module 120 stores labels and rules with label (for example, a keyword, regular expression, and the like).

The meta information label determination module 125 is connected to the mail acquisition module 115, the rule-with-meta-information-label storage module 120, and the label determination module 155. The meta information label determination module 125 determines a first label (hereinafter, also referred to as a meta information label) from information included in the e-mail transmitted from the mail acquisition module 115.

The "information included in the e-mail" may include information which is required to transmit and receive the e-mail, in addition to the title and the body of the e-mail (information readable by a person). Examples of the information required to transmit and receive the e-mail include an e-mail ID, address information, transmission source information, and the like.

As a first label determination method, specifically, the first label is determined in accordance with a first rule included in the rule-with-meta-information-label storage module 120 in which the "first label" and a "rule for determining the first label are associated with each other with the information included in the e-mail as a target".

The action history processing module 130 includes an action history database 135, an action history acquisition module 140, a rule-with-action-history-label storage module 145, and an action history label determination module 150. The action history processing module 130 performs a label impartation process based on the history of actions performed by a user, with respect to the e-mail.

The action history database 135 is connected to the action history acquisition module 140. The action history database 135 stores the history of the user's actions performed on the e-mail.

The action history acquisition module 140 is connected to the action history database 135 and the action history label determination module 150. The action history acquisition module 140 acquires the history of actions (for example, reply, forwarding, and the like) from the action history database 135 by using an e-mail ID as a clue, and transmits the acquired history to the action history label determination module 150.

The rule-with-action-history-label storage module 145 is connected to the action history label determination module 150. The rule-with-action-history-label storage module 145 stores labels and rules with label (for example, the name of an action, and the like).

The action history label determination module 150 is connected to the action history acquisition module 140, the rule-with-action-history-label storage module 145, and the label determination module 155. The action history label determination module 150 determines a second label (hereinafter, also referred to as an action history label) from the history of the e-mail which is transmitted from the action history acquisition module 140. Naturally, a target e-mail of the action history label determination module 150 and a target e-mail of the meta information label determination module 125 are the same as each other (that is, the e-mails have the same e-mail ID).

The "history of an e-mail" includes the history of operations performed by a user (an operator, a recipient, or the like) by using information included in the e-mail, in addition to the history of the e-mail itself. Examples of the history of operations include an operation of copying the information included in the e-mail to another application (for example, a schedule management application or the like), in addition to operations such as reply and forwarding of the e-mail.

As a second label determination method, specifically, the second label is determined in accordance with a second rule included in the rule-with-action-history-label storage module 145 in which the "second label" and a "rule for determining the second label are associated with each other with the history of the e-mail as a target".

For example, the action history label determination module 150 determines the second label from results of the user's response to the e-mail.

The label determination module 155 is connected to the meta information label determination module 125 of the meta information processing module 105, the action history label determination module 150 of the action history processing module 130, and the learning data database 160.

The label determination module 155 determines a third label which is a final label, on the basis of the first label determined by the meta information label determination module 125 and the second label determined by the action history label determination module 150.

For example, the label determination module 155 determines the third label as a negative example for machine learning which is to be imparted to the e-mail in a case where the first label determined by the meta information label determination module 125 and the second label determined by the action history label determination module 150 do not correspond to each other.

The label determination module 155 may adopt either the first label or the second label as the third label in a case where the first label and the second label do not correspond to each other.

In a case where either the first label or the second label is set to be no label, the label determination module 155 may adopt either the first label or the second label which is not set to be no label as the third label.

In addition, the label determination module 155 determines a third label as a positive example for machine learning which is to be imparted to the e-mail, in a case where the first label determined by the meta information label determination module 125 and the second label determined by the action history label determination module 150 correspond to each other.

The label determination module 155 may adopt the first label or the second label as the third label, in a case where the first label and the second label correspond to each other. Here, the "case where the first label and the second label correspond to each other" corresponds to a case where the first label and the second label are the same as each other.

In a case where both the first label determined by the meta information label determination module 125 and the second label determined by the action history label determination module 150 are set to be no label, the label determination module 155 may determine no label for machine learning which is to be imparted to the e-mail. In a case where either the first label or the second label is set to be no label, it is possible to reduce determination to be no label, as compared to a case where no label for machine learning which is to be imparted to the e-mail is determined.

In addition, the label determination module 155 may determine no label for machine learning which is to be imparted to the e-mail in a case where either the first label determined by the meta information label determination module 125 or the second label determined by the action history label determination module 150 is set to be no label. In a case where both the first label and the second label are set to be no label, it is possible to reduce the impartation of a label with low accuracy, as compared to a case where no label for machine learning which is to be imparted to the e-mail is determined.

In addition, the label determination module 155 may perform the following processing.

The label determination module 155 determines a third label for machine learning which is to be imparted to the e-mail from the first label determined by the meta information label determination module 125 and the second label determined by the action history label determination module 150.

As a third label determination method, specifically, a label is determined in accordance with a third rule in which a set of the "first label" and the "second label" is associated with the "third label". Information indicating whether the third label is a positive example or a negative example as teacher data may be added.

In addition, the label determination module 155 may adopt the first label or the second label as the third label in a case where the first label and the second label are the same as each other.

The label determination module 155 may set the third label to be no label in a case where both the first label and the second label are set to be no label. The case of setting to be "no label" does not correspond to the first rule included in the rule-with-meta-information-label storage module 120 and the second rule included in the rule-with-action-history-label storage module 145.

In addition, the label determination module 155 may adopt either the first label or the second label as the third label in a case where the first label and the second label are different from each other.

In addition, the label determination module 155 may adopt the second label as the third label in a case where the first label and the second label are different from each other. This is a determination attaching much importance to a recipient's action.

In a case where either the first label or the second label is set to be no label (a case where one label is set to be no label and the other label is not set to be no label (having any one label)), the label determination module 155 may adopt either the first label or the second label (the other label having any one label) which is not set to be no label as the third label.

In addition, the label determination module 155 may determine whether the third label is a positive example or a negative example as teacher information.

In a case where both the first label and the second label are the same as each other, the label determination module 155 may determine that the third label is a positive example.

In a case where the first label and the second label are different from each other, the label determination module 155 may determine that the third label is a negative example.

As a determination process in the label determination module 155, the case where the first label and the second label are different from each other may include a case where any one of the first label and the second label is set to be no label.

In a case where both the first label and the second label are not set to be no label, the label determination module 155 may determine that the third label is not a positive example. The "being not a positive example" as mentioned herein may refer setting to be no label or setting to be a negative example in a target label. Meanwhile, the "target label" as mentioned herein is a predetermined label, and the label may not be extracted by the meta information label determination module 125 and the action history label determination module 150 and is thus extracted as a label of a negative example. For example, although the target label is "important", "important" is not included in the title, and actions such as reply and forwarding are not also performed. Accordingly, "no label" is set in the meta information label determination module 125 and the action history label determination module 150. However, the label determination module 155 sets the e-mail as a negative example of "important" and registers the e-mail in the learning data database 160 as teacher data.

The learning data database 160 is connected to the label determination module 155. The learning data database 160 stores teacher data in which the third label determined by the label determination module 155 and the e-mail are associated with each other.

Figure 2:
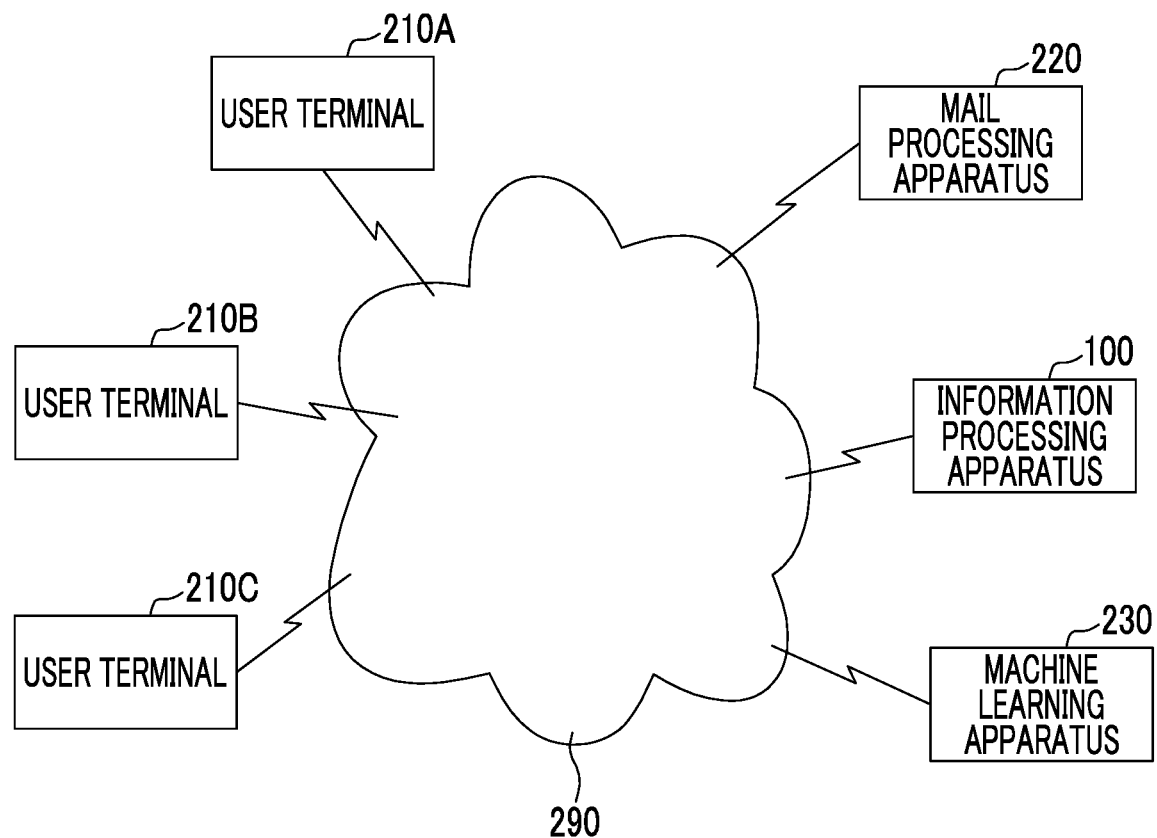
FIG. 2 is a diagram illustrating a system configuration example using this exemplary embodiment.

FIG. 2 is a diagram illustrating a system configuration example using this exemplary embodiment.

The information processing apparatus 100, a user terminal 210A, a user terminal 210B, a user terminal 210C, a mail processing apparatus 220, and a machine learning apparatus 230 are connected to each other through a communication line 290. The communication line 290 may be a wireless line, a wired line, or a combination thereof, and may be, for example, the Internet, an intranet, or the like as communication infrastructure. In addition, the functions of the information processing apparatus 100, the mail processing apparatus 220, and the machine learning apparatus 230 may be realized as cloud service.

The mail processing apparatus 220 performs processing related to the forwarding of an e-mail. Examples of the mail processing apparatus include a POP server, an SMTP server, a WEB mail server, and the like. In a case where the mail processing apparatus 220 collects e-mails, the mail database 110 may be provided within the mail processing apparatus 220 instead of the information processing apparatus 100.

The mail processing apparatus 220 or the information processing apparatus 100 collects histories of processing performed on an e-mail from the mail processing apparatus 220 and the user terminals 210, and stores the collected histories in the action history database 135.

The machine learning apparatus 230 performs machine learning by using teacher data stored in the learning data database 160 of the information processing apparatus 100. The learning data database 160 may be provided within the machine learning apparatus 230 instead of the information processing apparatus 100. As the machine learning, identification devices such as a neural network, a decision tree, and a support vector machine may be used.

The information processing apparatus 100 performs, for example, the following processing. In particular, this description (description in this paragraph number) is given to facilitate the understanding of this exemplary embodiment, and limited analysis using this description is not intended. It is natural that determination should not be performed regarding whether the invention for which a patent is sought is described in the detailed description of the invention (Patent Act Article 36(6)(i)) by using this description part.

In general, high costs are required to create teacher data. For example, in a case where the teacher data is created by hand, costs are increased. In a method in which the teacher data is automatically created using an entry word, the entry word does not necessarily represent contents of the body text, and the quality of annotation is inferior. For example, in two-way communication such as an e-mail, a subject (entry word) attached by a writer (transmitter) and a subject recognized by a receiver (recipient) may be different from each other. Specifically, the entirety of an e-mail written to be [important] is not necessarily important to the recipient.

The information processing apparatus 100 improves the quality of the teacher data while suppressing creation costs of the teacher data.

The information processing apparatus 100 improves the quality of the teacher data in consideration of an action on an e-mail (for example, reply, forwarding, the impartation of task, sharing, the registration of a schedule, and the like) and meta information (the number of recipients, the presence or absence of an attached file, and the like) which are added.

For example, in a case where a keyword (expression) related to a label is included in the subject of an e-mail, there is a strong possibility that the e-mail is a positive example. Specifically, in a case where the subject is "[important] ○○", "[reply required] ΔΔ", or the like, the former subject is highly likely to indicate an e-mail of "important", and the latter subject is highly likely to indicate an e-mail of "reply required".

There is a higher possibility that an e-mail having been subjected to an action related to a label is a positive example. For example, there is a strong possibility that "reply" is performed as an action on an e-mail in a case where the e-mail is an e-mail of "reply required" (an e-mail to which "reply required" as a third label is imparted), "reply", "forwarding", and "impartation of task" are performed as actions on an e-mail in a case where the e-mail is an e-mail of "important" (an e-mail to which "important" as a third label is imparted), and "reply" and "registration of calendar" are performed as actions on an e-mail in a case where the e-mail is an e-mail of "adjustment of schedule" (an e-mail to which "adjustment of schedule" as a third label is imparted).

Consequently, the information processing apparatus 100 determines a first label from information included in an e-mail, determines a second label from an action on the e-mail, and determines a label (third label) to be imparted to the e-mail by using both the first label and the second label.

Figure 3:
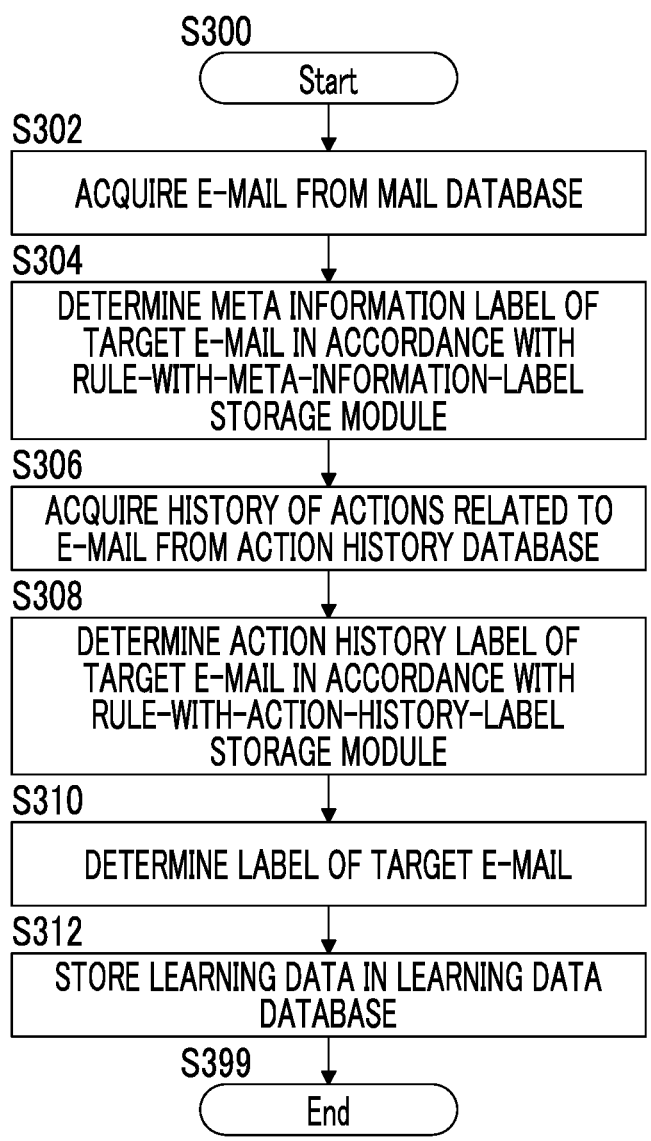
FIG. 3 is a flowchart illustrating a processing example according to this exemplary embodiment.

FIG. 3 is a flowchart illustrating a processing example according to this exemplary embodiment.

In step S302, the mail acquisition module 115 acquires an e-mail from the mail database 110. For example, the mail information table 400 is stored in the mail database 110, and any one row (e-mail) is selected.

FIG. 4 is a diagram illustrating an example of a data structure of the mail information table 400. The mail information table 400 includes a mail ID column 410, a title column 420, a transmitter column 430, a recipient column 440, and an attached file column 450. The mail ID column 410 stores information (mail ID) for uniquely identifying an e-mail in this exemplary embodiment. The title column 420 stores the title of the e-mail. The transmitter column 430 stores the transmitter of the e-mail. The recipient column 440 stores the recipient of the e-mail. The attached file column 450 stores an attached file of the e-mail.

For example, in FIG. 4, an e-mail of mail 1 includes title: "[important] change of specification of ○○", transmitter: "user A", recipient: "users B, C, and D", and attached file: "specifications.pdf", an e-mail of mail 2 includes title: "[important] seminar information", transmitter: "user A", recipient: "users B, C, and D", and attached file: "seminar data.pptx", an e-mail of mail 3 includes title: "3/21 weekly report", transmitter: "user A", recipient: "users D, E, and F", and attached file: "none".

In step S304, the meta information label determination module 125 determines a meta information label (first label) of a target e-mail in accordance with the rule-with-meta-information-label storage module 120. For example, a rule table with meta information label 500 included in the rule-with-meta-information-label storage module 120 is used.

FIG. 5 is a diagram illustrating an example of a data structure of the rule table with meta information label 500. The rule table with meta information label 500 includes a rule ID column 510, a label column 520, and a rule column 530. The rule ID column 510 stores information (rule ID) for uniquely identifying a rule in this exemplary embodiment. The label column 520 stores a label in a case where the rule is suitable. The rule column 530 stores a rule.

For example, in FIG. 5, rule 1 is conditioned to be suitable for "title includes "[important]" and "[urgent]", and attached file is present" in determining a first label: "important". Rule 2 is conditioned to be suitable for "title includes "[fixed]" and expression of date" in determining a first label: "adjustment of schedule". Rule 3 is conditioned to be suitable for "title includes "[reply required]" or "[reply desired]"" in determining a first label: "reply required".

In a case where the rule table with meta information label 500 illustrated in the example of FIG. 5 is applied to the mail information table 400 illustrated in the example of FIG. 4, a first label is determined as follows.

Mail 1: an "important" label is imparted because of being suitable for the rule 1.

Mail 2: an "important" label is imparted because of being suitable for the rule 1.

Mail 3: "no label" is imparted because of being unsuitable for both the rules 1 and 2.

In step S306, the action history acquisition module 140 acquires the history of actions related to an e-mail from the action history database 135. For example, an action history information table 600 is stored in the action history database 135, and the row (action on the e-mail) of the e-mail which is acquired in step S302 is selected.

FIG. 6 is a diagram illustrating an example of a data structure of the action history information table 600. The action history information table 600 includes a mail ID column 610, an operator column 620, and an action column 630. The mail ID column 610 stores a mail ID. The operator column 620 stores an operator (in general, a recipient) for the mail. The action column 630 stores an action on the mail.

For example, in FIG. 6, an action: "reply" is performed by an operator: "user B" with respect to the mail 1, an action: "forwarding" is performed by an operator: "user C" with respect to the mail 1, an action: "reply" is performed by an operator: "user D" with respect to the mail 2, and an action: "reply" is performed by an operator: "user F" with respect to the mail 3.

In step S308, the action history label determination module 150 determines an action history label (second label) of a target e-mail in accordance with the rule-with-action-history-label storage module 145. For example, a rule table with action history label 700 included in the rule-with-action-history-label storage module 145 is used.

FIG. 7 is a diagram illustrating an example of a data structure of the rule table with action history label 700. The rule table with action history label 700 includes a rule ID column 710, a label column 720, and a rule column 730. The rule ID column 710 stores a rule ID. The label column 720 stores a label in a case where the rule is suitable. The rule column 730 stores a rule.

For example, in FIG. 7, rule A1 is conditioned to be suitable for "the number of recipients having performed reply and forwarding is equal to or greater than half of recipients" in determining a second label: "important". Rule A2 is conditioned to be suitable for "recipient is registered in calendar" in determining a second label: "adjustment of schedule". In addition, for example, a rule conditioned to be suitable for "the number of recipients having performed reply is equal to or greater than half of recipients" in determining a second label: "reply required" may be added.

In a case where the rule table with action history label 700 illustrated in the example of FIG. 7 is applied to the action history information table 600 illustrated in the example of FIG. 6, a second label is determined as follows.

Mail 1: an "important" label is imparted because of being suitable for the rule A1.

Mail 2: "no label" is imparted because of being unsuitable for both the rules A1 and A2.

Mail 3: "no label" is imparted because of being unsuitable for both the rules A1 and A2.

In step S310, the label determination module 155 determines a label (third label) of a target e-mail. Hereinafter, four examples (X1, X2, X3, and X4) are shown.

(X1) For example, (1) in a case where the label based on meta information and the label based on the history of actions are the same as each other, the label based on meta information or the label based on the history of actions (since both the labels are the same as each other, either one may be adopted) is adopted as a final label, (2) in a case where both the label based on meta information and the label based on the history of actions indicate no label, a final label is set to be no label, and (3) in a case where either the label based on meta information or the label based on the history of actions indicates no label, a learning data table 800 is generated as a processing result in a case where a rule for adopting either the label based on meta information or the label based on the history of actions, which does not indicate no label as a final label, is applied.

FIG. 8 is a diagram illustrating an example of a data structure of the learning data table 800. The learning data table 800 includes a mail ID column 810, a label-based-on-meta-information column 820, a label-based-on-history-of-actions column 830, and a final label column 840. The mail ID column 810 a mail ID. The label-based-on-meta-information column 820 stores a label (first label) based on meta information. The label-based-on-history-of-actions column 830 stores a label (second label) based on the history of actions. The final label column 840 stores a final label (third label).

For example, mail 1 includes label: "important" based on meta information, label: "important" based on the history of actions, and final label: "important", mail 2 includes label: "important" based on meta information, label: "no label" based on the history of actions, and final label: "important", and mail 3 includes label: "no label" based on meta information, label: "no label" based on the history of actions, and final label: "no label".

That is, the mails are as follows.

Mail 1: an "important" label is imparted because the "important" label is imparted for all of the labels.

Mail 2: an "important" label is imparted because the label based on meta information is set to be "important".

Mail 3: "no label" (not used for learning data) is imparted because the "no label" is imparted for all of the labels.

(X2) In addition, for example, (1) in a case where the label based on meta information and the label based on the history of actions are the same as each other, the label based on meta information or the label based on the history of actions (since both the labels are the same as each other, either one may be adopted) is adopted as a final label, (2) in a case where both the label based on meta information and the label based on the history of actions indicate no label, a final label is set to be no label, and (3) in a case where both the label based on meta information and the label based on the history of actions are different from each other, a learning data table 900 is generated as a processing result in a case where a rule for adopting the label based on the history of actions is adopted as a final label.

FIG. 9 is a diagram illustrating an example of a data structure of the learning data table 900.

The learning data table 900 includes a mail ID column 910, a label-based-on-meta-information column 920, a label-based-on-history-of-actions column 930, and a final label column 940. The mail ID column 910 stores a rule ID. The label-based-on-meta-information column 920 stores a label (first label) based on meta information. The label-based-on-history-of-actions column 930 stores a label (second label) based on the history of actions. The final label column 940 stores a final label (third label).

For example, the mail 1 includes label: "important" based on meta information, label: "important" based on the history of actions, and final label: "important", the mail 2 includes label: "important" based on meta information, label: "no label" based on the history of actions, and final label: "no label", and the mail 3 includes label: "no label" based on meta information, label: "no label" based on the history of actions, and final label: "important".

That is, the mails are as follows.

Mail 1: an "important" label is imparted because the "important" label is imparted for all of the labels.

Mail 2: "no label" (not used for learning data) is imparted because all of the labels are different from each other and the label based on the history of actions is set to be "no label".

Mail 3: "no label" (not used for learning data) is imparted because the "no label" is imparted for all of the labels.

(X3) In addition, a case including whether a final label is a positive example or a negative example as teacher information may be as follows.

For example, (1) in a case where the label based on meta information and the label based on the history of actions are the same as each other, the label based on meta information or the label based on the history of actions (since both the labels are the same as each other, either one may be adopted) is adopted as a final label, (2) in a case where both the label based on meta information and the label based on the history of actions indicate no label, a final label is set to be no label, (3) in a case where either the label based on meta information or the label based on the history of actions indicates no label, either the label based on meta information or the label based on the history of actions, which does not indicate no label as a final label, is applied, (4) in a case where both the label based on meta information and the label based on the history of actions are the same as each other, a final label is set to be a positive example, (5) in a case where the label based on meta information and the label based on the history of actions are different from each other (one of the labels includes no label), a learning data table 1000 is generated as a processing result in a case where a rule for adopting a negative example as a final label is applied.

FIG. 10 is a diagram illustrating an example of a data structure of the learning data table 1000. The learning data table 1000 includes a mail ID column 1010, a label-based-on-meta-information column 1020, a label-based-on-history-of-actions column 1030, a final label column 1040, and a positive example/negative example column 1050. The mail ID column 1010 stores a rule ID. The label-based-on-meta-information column 1020 stores a label (first label) based on meta information. The label-based-on-history-of-actions column 1030 stores a label (second label) based on the history of actions. The final label column 1040 stores a final label (third label). The positive example/negative example column 1050 stores either a positive example or a negative example.

For example, mail 1 includes label: "important" based on meta information, label: "important" based on the history of actions, final label: "important", and positive example/negative example: "positive example", mail 2 includes label: "important" based on meta information, label: "no label" based on the history of actions, final label: "important", and positive example/negative example: "negative example", and mail 3 includes label: "no label" based on meta information, label: "no label" based on the history of actions, final label: "no label", and positive example/negative example: "- (null)".

That is, the mails are as follows.

Mail 1: an "important" label which is a positive example is imparted because the "important" label is imparted for all of the labels.

Mail 2: "important" which is a negative example is imparted because a label based on meta information is set to be "important" and a label based on the history of actions is set to be "no label".

Mail 3: "no label" (not used for learning data) is imparted because the "no label" is imparted for all of the labels.

Since it is easy to achieve a high level of accuracy in a case where learning data includes a negative example (near-miss example) close to a positive example in machine learning, there is a strong possibility that the level of accuracy is increased more in a case where the mail 2 is set to be a negative example than in a case where the mail 3 is set to be a negative example.

(X4) In addition, for example, (1) in a case where the label based on meta information and the label based on the history of actions are the same as each other, the label based on meta information or the label based on the history of actions (since both the labels are the same as each other, either one may be adopted) is adopted as a final label, (2) in a case where both the label based on meta information and the label based on the history of actions indicate no label, a target label is adopted, and the label is set to be a negative example, (3) in a case where the label based on meta information and the label based on the history of actions are different from each other, a label based on the history of actions is adopted as a final label, and (4) in a case where both the label based on meta information and the label based on the history of actions are the same as each other, a learning data table 1100 is generated as a processing result in a case where a rule for setting the final label to be a positive example is applied. Meanwhile, the "target label" in the example of FIG. 11 is "important" which is determined in advance.

FIG. 11 is a diagram illustrating an example of a data structure of the learning data table 1100. The learning data table 1100 includes a mail ID column 1110, a label-based-on-meta-information column 1120, a label column 1130 based on the history of actions, a final label column 1140, and a positive example/negative example column 1150. The mail ID column 1110 stores a rule ID. The label-based-on-meta-information column 1120 stores a label (first label) based on meta information. The label column 1130 based on the history of actions stores a label (second label) based on the history of actions. The final label column 1140 stores a final label (third label). The positive example/negative example column 1150 stores either a positive example or a negative example.

For example, mail 1 includes label: "important" based on meta information, label: "important" based on the history of actions, final label: "important", and positive example/negative example: "positive example", mail 2 includes label: "important" based on meta information, label: "no label" based on the history of actions, final label: "no label", and positive example/negative example: "- (null)", and mail 3 includes label: "no label" based on meta information, label:

"no label" based on the history of actions, final label: "important", and positive example/negative example: "negative example".

That is, the mails are as follows.

Mail 1: an "important" label which is a positive example is imparted because the "important" label is imparted for all of the labels.

Mail 2: "no label" (not used for learning data) is imparted because all of the labels are different from each other and the label based on the history of actions is set to be "no label".

Mail 3: "important" (negative example) which is a target label is imparted because "no label" is imparted for all of the labels.

In step S312, the label determination module 155 stores learning data in the learning data database 160. Specifically, the learning data table 800, the learning data table 900, the information processing apparatus 100, and the learning data table 1100 which are illustrated in the examples of FIGS. 8 to 11 are stored in the learning data database 160. Meanwhile, the learning data table 800 and the learning data table 900 may include learning data constituted by only a mail ID column and a final label column, and the learning data table 1000 and the learning data table 1100 may include learning data constituted by only a mail ID column, a final label column, and a positive example/negative example column.

In addition, regarding (1) a set of the processes of step S302 and step S304 and (2) a set of the processes of step S306 and step S308, any set of the processes may be performed first, or the sets of the processes may be performed in parallel.

Figure 12:
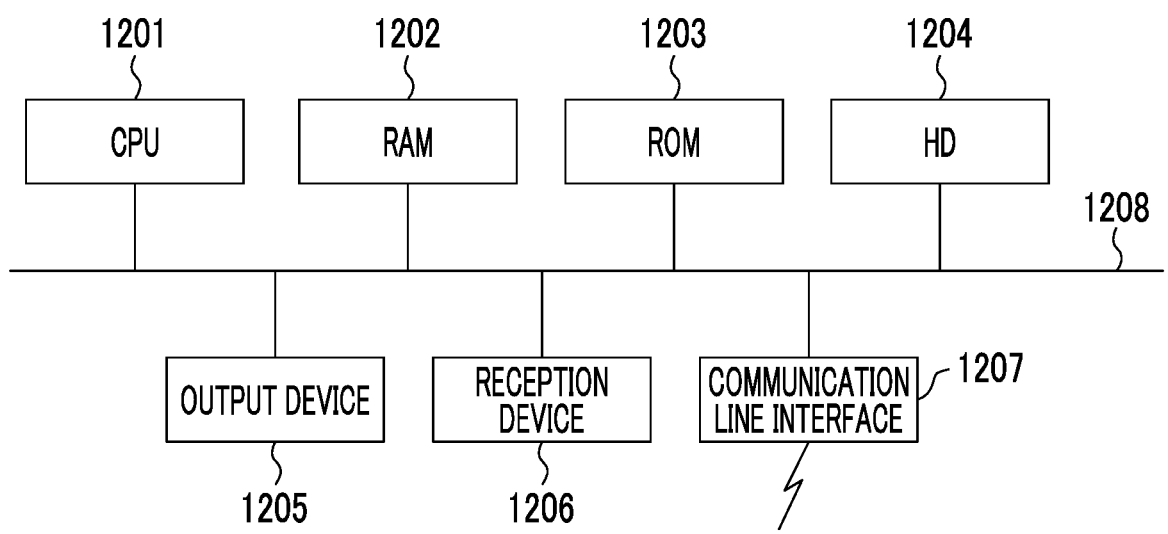
FIG. 12 is a block diagram illustrating a hardware configuration example of a computer for realizing this exemplary embodiment.

Meanwhile, a hardware configuration of a computer executing a program as this exemplary embodiment is a general computer as illustrated in FIG. 12, and specifically, is a personal computer, a computer serving as a server, or the like. That is, as a specific example, a CPU 1201 is used as a processing unit (computational unit), and a RAM 1202, a ROM 1203, and an HD 1204 are used as storage devices. As the HD 1204, for example, a hard disk or a Solid State Drive (SSD) may be used. The computer includes the CPU 1201 that executes programs such as the mail acquisition module 115, the meta information label determination module 125, the action history acquisition module 140, the action history label determination module 150, and the label determination module 155, the RAM 1202 that stores the programs and data, the ROM 1203 that stores programs for starting up the computer, and the like, the HD 1204 which is an auxiliary storage device (may be a flash memory or the like) including functions as the mail database 110, the rule-with-meta-information-label storage module 120, the action history database 135, the rule-with-action-history-label storage module 145, and the learning data database 160, a reception device 1206 that receives data on the basis of a user's operation (including a motion, a sound, an eye gaze, and the like) with respect to a keyboard, a mouse, a touch screen, a microphone, a camera (including an eye gaze detection camera, and the like), and the like, an output device 1205 such as a CRT, a liquid crystal display, or a speaker, a communication line interface 1207, such as a network interface card, for connection to a communication network, and a bus 1208 for transmitting and receiving data by connecting the above-mentioned components. Plural computers may be connected to each other through a network.

Regarding the exemplary embodiment based on a computer program among the above-described exemplary embodiments, a system having this hardware configuration is caused to read a computer program which is software, and the above-described exemplary embodiment is realized by the cooperation of software and hardware resources.

Meanwhile, a hardware configuration illustrated in FIG. 12 shows one configuration example. This exemplary embodiment is not limited to the configuration illustrated in FIG. 12, and the information processing apparatus may be configured such that the modules described in this exemplary embodiment are capable of being executed. For example, some modules may be constituted by dedicated hardware (for example, an Application Specific Integrated Circuit (ASIC) or the like), some modules may be configured to be provided in an external system and connected to each other through a communication line, or plural systems each of which is illustrated in FIG. 12 may be connected to each other through a communication line and operated in cooperation with each other. In addition, the information processing apparatus may be particularly incorporated into portable information communication equipment (including a mobile phone, a smart phone, a mobile equipment, a wearable computer, and the like), an information appliance, a robot, a copying machine, a facsimile, a scanner, a printer, a multifunction machine (an image processing apparatus including any two or more of a scanner, a printer, a copying machine, and a facsimile), and the like, in addition to a personal computer.

Meanwhile, the programs described above may be provided through a recording medium which stores the programs, or may be provided through a communication unit. In these cases, for example, the programs described above may be interpreted as an invention of "a computer-readable recording medium that stores programs".

The "computer-readable recording medium that stores programs" refers to a computer-readable recording medium that stores programs and is used for the installation and execution of the programs and the distribution of the programs.

Meanwhile, examples of the recording medium include a digital versatile disk (DVD) having a format of "DVD-R, DVD-RW, DVD-RAM, or the like" which is a standard developed by the DVD forum or having a format of "DVD+R, DVD+RW, or the like" which is a standard developed by the DVD+RW alliance, a compact disk (CD) having a format of CD read only memory (CD-ROM), CD recordable (CD-R), CD rewritable (CD-RW), or the like, a Blu-ray Disc (registered trademark), a magneto-optical disk (MO), a flexible disk (FD), a magnetic tape, a hard disk, a read only memory (ROM), an electrically erasable programmable ROM (EEPROM (registered trademark)), a flash memory, a random access memory (RAM), a secure digital (SD) memory card, and the like.

The above-described programs or some of them may be stored and distributed by recording on the recording medium. In addition, the programs may be transmitted through communication, for example, by using a transmission media of, for example, a wired network which is used for a local area network (LAN), a metropolitan area network (MAN), a wide area network (WAN), the Internet, an intranet, an extranet, and the like, a wireless communication network, or a combination of these. The programs may be carried on carrier waves.

Further, the above-described programs may be a portion or all of other programs, or may be recorded on a recording medium along with other programs. The programs may be recorded on plural recording media by dividing the programs. The programs may be recorded in any format, such as compression or encryption, as long as it is possible to restore the programs.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to:
determine a first label from information included in an e-mail;
determine a second label from a result of a response made to the e-mail by a user; and
determine a third label as a negative example for machine learning which is imparted to the e-mail, in a case where the first label and the second label do not correspond to each other.

2. The information processing apparatus according to claim 1, wherein the processor is configured to adopt either the first label or the second label as the third label in a case where the first label and the second label do not correspond to each other.

3. The information processing apparatus according to claim 2, wherein the processor is configured to adopt either the first label or the second label which is not set to be no label as the third label in a case where either the first label or the second label is set to be no label.

4. An information processing apparatus comprising: a processor configured to:
determine a first label from information included in an e-mail;
determine a second label from a result of a response made to the e-mail by a user; and
determine a third label as a positive example for machine learning which is imparted to the e-mail, in a case where the first label and the second label correspond to each other.

5. The information processing apparatus according to claim 4, wherein the processor is configured to adopt the first label or the second label as the third label in a case where the first label and the second label correspond to each other.

* * * * *